(12) United States Patent
Zhang et al.

(10) Patent No.: US 11,147,033 B2
(45) Date of Patent: Oct. 12, 2021

(54) TIMING ADVANCE DETERMINING METHOD AND DEVICE

(71) Applicant: Huawei Technologies Co., Ltd., Shenzhen (CN)

(72) Inventors: Zhang Zhang, Shanghai (CN); Zhenfei Tang, Ottawa (CA); Fan Wang, Berkshire (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 16/586,414

(22) Filed: Sep. 27, 2019

(65) Prior Publication Data
US 2020/0029293 A1 Jan. 23, 2020

Related U.S. Application Data

(63) Continuation of application No. PCT/CN2018/099731, filed on Aug. 9, 2018.

(30) Foreign Application Priority Data

Aug. 11, 2017 (CN) .......................... 201710687264.2

(51) Int. Cl.
*H04W 56/00* (2009.01)
*H04L 5/00* (2006.01)
(Continued)

(52) U.S. Cl.
CPC ....... *H04W 56/0045* (2013.01); *H04L 5/0094* (2013.01); *H04L 27/2607* (2013.01); *H04W 56/0005* (2013.01); *H04W 72/0453* (2013.01)

(58) Field of Classification Search
CPC ........... H04W 56/0045; H04W 56/005; H04W 72/0453; H04W 24/02; H04W 56/00;
(Continued)

(56) References Cited

U.S. PATENT DOCUMENTS 10,531,467 B2 * 1/2020 Lin ....................... H04W 48/12
10,750,534 B2 * 8/2020 Son .................... H04W 56/0005
(Continued)

FOREIGN PATENT DOCUMENTS

CN 101572577 A 11/2009
CN 106538039 A 3/2017
(Continued)

OTHER PUBLICATIONS

Qualcomm Incorporated, "Timing advance for different numerology", 3GPP TSG-RAN WG1 NR Ad Hoc #2 R1-1711208, Jun. 27-30, 2017, Qingdao, China, 1 page.
(Continued)

*Primary Examiner* — Hanh N Nguyen (74) *Attorney, Agent, or Firm* — Slater Matsil, LLP (57) ABSTRACT

A timing advance determining method and a device are provided. In the method, a network device determines, based on a correspondence between a parameter set and a TA granularity, TA information used by a terminal on an occupied frequency domain resource, where the parameter set includes a subcarrier spacing and a cyclic prefix type of a symbol; the network device sends the TA information to the terminal; and the terminal determines, based on the correspondence between a parameter set and a TA granularity, a TA granularity corresponding to the frequency domain resource occupied by the terminal, and determines, based on the TA granularity and the TA information, a TA value used by the terminal on the occupied frequency domain resource.

18 Claims, 6 Drawing Sheets

(51) Int. Cl.
*H04L 27/26* (2006.01)
*H04W 72/04* (2009.01)

(58) Field of Classification Search
CPC ........... H04W 72/0413; H04W 56/001; H04W 72/0446; H04L 5/0094; H04L 27/2607; H04L 5/14; H04L 5/00
See application file for complete search history.

(56) References Cited

U.S. PATENT DOCUMENTS

| | | | |
|---|---|---|---|
| 2011/0051633 A1 | 3/2011 | Pan et al. | |
| 2016/0345316 A1* | 11/2016 | Kazmi | H04W 56/0045 |
| 2018/0352527 A1* | 12/2018 | Wang | H04L 5/0053 |
| 2019/0013982 A1 | 1/2019 | Sun et al. | |
| 2019/0053182 A1* | 2/2019 | Choi | H04W 56/0045 |
| 2019/0141697 A1* | 5/2019 | Islam | H04W 56/0045 |
| 2019/0174513 A1* | 6/2019 | Loehr | H04W 72/1242 |
| 2020/0221508 A1* | 7/2020 | Huang | H04W 74/0833 |

FOREIGN PATENT DOCUMENTS

| | | |
|---|---|---|
| EP | 3151625 A1 | 4/2017 |
| WO | 2011085200 A1 | 7/2011 |
| WO | 2018060980 A1 | 4/2018 |

OTHER PUBLICATIONS

Huawei et al. "On NR carrier aggregation", 3GPP TSG RAN WG1 Meeting #90 R1-1712160, Prague, Czech Republic, Aug. 21-25, 2017, 12 pages.

3GPP TR 36.802 V13.0.0 (Jun. 2016); 3rd Generation Partnership Project;Technical Specification Group Radio Access Network;Evolved Universal Terrestrial Radio Access (E-UTRA); NB-IOT; Technical Report for BS and UE radio transmission and reception (Release 13); 59 pages.

Ericsson, "Requirements for NR UE timing advance", 3GPP TSG-RAN WG4 Meeting NR#2 Ad Hoc R4-1706716, Qingdao, China, Jun. 27-29, 2017, 7 pages.

* cited by examiner

| TAG 1 | TAG 2 | TAG 3 | TAG 4 |
|---|---|---|---|
| CC 1 BWP 1 Beam (beam) 1 | CC 1 BWP 2 Beam (beam) 1 | CC 1 BWP 1 Beam (beam) 2 | CC 1 BWP 2 Beam (beam) 2 |
| CC 2 BWP 2 Beam (beam) 1 | CC 2 BWP 1 Beam (beam) 1 | | CC 2 BWP 1 Beam (beam) 2 |
| CC 3 BWP 1 Beam (beam) 2 | CC 3 BWP 2 Beam (beam) 1 | CC 3 BWP 1 Beam (beam) 1 | CC 3 BWP 3 Beam (beam) 1 |
| CC 4 BWP 2 Beam (beam) 1 | CC 4 BWP 1 Beam (beam) 2 | | CC 4 BWP 1 Beam (beam) 1 |

TIMING ADVANCE DETERMINING METHOD AND DEVICE

CROSS-REFERENCE TO RELATED APPLICATIONS

This application is a continuation of International Application No. PCT/CN2018/099731, filed on Aug. 9, 2018, which claims priority to Chinese Patent Application No. 201710687264.2 filed on Aug. 11, 2017. The disclosures of the aforementioned applications are hereby incorporated by reference in their entireties.

TECHNICAL FIELD

This application relates to the field of communications technologies, and in particular, to a timing advance (TA) determining method and a device.

BACKGROUND

In long term evolution (LTE), a carrier aggregation (CA) technology is introduced. To be specific, a plurality of continuous or discontinuous spectrums are aggregated for use, and this technically meets a requirement of mobile communications on a high bandwidth, and also improves utilization of scattered spectrums in a wireless frequency band.

To avoid interference between a plurality of terminals, a network device requires that signals sent by different terminals from different frequency domain resources arrive at the network device basically at the same time. However, due to different environments of the terminals and different distances between the terminals and the network device, there is a difference between times at which the signals sent by the terminals arrive at the network device. Therefore, the network device may set different advances for different terminals, and the terminals sends uplink signals in advance based on the advances of the terminals, so that the uplink signals sent by the different terminals arrive at the network device almost at the same time. This is a timing advance mechanism. The uplink signal sent by the terminal usually includes a cyclic prefix (CP) and a symbol. The cyclic prefix is formed by copying a segment of data after a data symbol to the front of the symbol. Therefore, even if the network device starts receiving the data symbol from a moment in the cyclic prefix, the network device can still obtain the complete data symbol sent by the terminal. This provides an error tolerance range for a timing advance.

In an existing LTE system, a time granularity used by the network device when the network device indicates the timing advance to the terminal is 16 Ts, where 1 Ts is 1/(15000*2048) second. For example, if the timing advance indicated by the network device to the terminal is 2, it indicates that the timing advance of the terminal is 2*16 Ts=2*16*1/(15000*2048)≈1.04 µs.

A subcarrier spacing (SCS) in a frequency domain resource in the LTE system is usually 15 kHz. However, in a fifth generation mobile communications system (the fifth generation, 5G), in addition to the subcarrier spacing of 15 kHz, a plurality of subcarrier spacings of 30 kHz, 60 kHz, 120 kHz, and the like are further specified. In another future communications system, a plurality of subcarrier spacings may be supported at the same time. A plurality of parameter sets (numerology) may be obtained through combination based on subcarrier spacings and cyclic prefix types (for example, a normal cyclic prefix (NCP) and an extended cyclic prefix (ECP)), as shown in Table 1. In LTE and new radio (NR), for symbols at different locations in a same numerology, CP lengths may not be exactly the same. For example, one slot includes seven symbols, and a CP length on the first symbol may be different from a CP length on another symbol. CP lengths shown in Table 1 are shortest CP lengths.

TABLE 1

| Numerology | CP length (in a unit of Ts in LTE) |
| --- | --- |
| 15 kHz and an NCP | 144 |
| 30 kHz and an NCP | 72 |
| 60 kHz and an NCP | 36 |
| 60 kHz and an ECP | 128 |
| 120 kHz and an NCP | 18 |

When a subcarrier spacing or a cyclic prefix type changes, a requirement on timing advance precision changes accordingly. Therefore, a TA granularity in a current system cannot meet a requirement of a 5G or future communications system on timing advance precision

SUMMARY

This application provides a timing advance determining method and a device, to meet different requirements of different parameter sets on TA granularities when there is a plurality of parameter sets.

According to a first aspect, a timing advance (TA) determining method provided in an embodiment of this application includes: determining, by a network device based on a correspondence between a parameter set and a TA granularity, TA information used by a terminal on an occupied frequency domain resource, where the parameter set includes a subcarrier spacing (SCS) and a cyclic prefix (CP) type; and sending, by the network device, the TA information to the terminal.

In a current system, the network device uses a uniform TA granularity when determining the TA information of the terminal. However, in the foregoing embodiment of this application, a TA granularity corresponding to each parameter set is set for the parameter set. Therefore, the network device can select, based on a parameter set corresponding to a resource occupied by the terminal, a corresponding TA granularity when determining the TA information for the terminal, so that the determined TA information can satisfy different requirements of different parameter sets on TA precision.

In a possible implementation, the TA granularity corresponding to the parameter set is in inverse proportion to the SCS in the parameter set; or SCSs are in inverse proportion; or when the CP type is a normal CP, the TA granularity corresponding to the parameter set is in inverse proportion to a CP length corresponding to the parameter set; or the TA granularity corresponding to the parameter set is a TA granularity corresponding to a value range within which the SCS in the parameter set falls; or the TA granularity corresponding to the parameter set is a TA granularity corresponding to a value range within which a CP length corresponding to the parameter set falls.

In a possible implementation, a TA granularity corresponding to a parameter set including an SCS that is 15 kHz and a CP type that is a normal CP is 16 Ts; or a TA granularity corresponding to a parameter set including an SCS that is 30 kHz and a CP type that is a normal CP is 8

Ts; or a TA granularity corresponding to a parameter set including an SCS that is 60 kHz and a CP type that is a normal CP is 4 s; or a TA granularity corresponding to a parameter set including an SCS that is 60 kHz and a CP type that is an extended CP is 8 Ts or 16 Ts; or a TA granularity corresponding to a parameter set including an SCS that is 120 kHz and a CP type that is a normal CP is 2 Ts.

In a possible implementation, parameter sets including different SCSs correspond to different relative maximum latency differences.

In a possible implementation, TA information corresponding to different parameter sets occupies a same quantity of bits, and bits occupied by TA information corresponding to at least one parameter set include a reserved bit.

In a possible implementation, a quantity of bits occupied by TA information corresponding to at least one parameter set is different from a quantity of bits occupied by TA information corresponding to another parameter set.

In a possible implementation, the method further includes: sending, by the network device, timing advance group (TAG) information to the terminal, where a frequency domain resource in each TAG is one of a bandwidth part, a bandwidth part with space direction information, and a component carrier with space direction information.

In a possible implementation, the method further includes: sending, by the network device, timing advance group (TAG) information to the terminal, where frequency domain resources in each TAG correspond to a same parameter set or a parameter set corresponding to a frequency domain resource in each TAG satisfies a preset condition.

In a possible implementation, a maximum TAG quantity corresponding to at least one parameter set is different from a maximum TAG quantity corresponding to another parameter set.

In a possible implementation, a maximum TAG quantity corresponding to a parameter set is in proportion to an SCS in the parameter set; or a maximum TAG quantity corresponding to a parameter set is in proportion to a CP length corresponding to the parameter set; or a maximum TAG quantity corresponding to a parameter set is a maximum TAG quantity corresponding to a value range within which an SCS in the parameter set falls; or a maximum TAG quantity corresponding to a parameter set is a maximum TAG quantity corresponding to a value range within which a CP length corresponding to the parameter set falls.

In a possible implementation, a maximum TAG quantity corresponding to a parameter set including an SCS that is 15 kHz and a CP type that is a normal CP is 4; or a maximum TAG quantity corresponding to a parameter set including an SCS that is 30 kHz and a CP type that is a normal CP is 8; or a maximum TAG quantity corresponding to a parameter set including an SCS that is 60 kHz is 16; or a maximum TAG quantity corresponding to a parameter set including an SCS that is 60 kHz and a CP type that is an extended CP is 8 or 16; or a maximum TAG quantity corresponding to a parameter set including an SCS that is 120 kHz and a CP type that is a normal CP is 32.

In a possible implementation, a parameter set including an SCS that is 60 kHz and a CP type that is a normal CP and a parameter set including an SCS that is 60 kHz and a CP type that is an extended CP are different in at least one of TA granularities, quantities of bits occupied by TA information, and quantities of maximum TAG quantities that respectively correspond to the two parameter sets.

According to a second aspect, a timing advance (TA) determining method provided in an embodiment of this application includes: receiving, by a terminal, TA information sent by a network device; determining, by the terminal based on a correspondence between a parameter set and a TA granularity, a TA granularity corresponding to a frequency domain resource occupied by the terminal, where the parameter set includes a subcarrier spacing (SCS) and a cyclic prefix (CP) type; and determining, by the terminal based on the TA granularity and the TA information, a TA value used by the terminal on the occupied frequency domain resource.

In the current technology, the TA information sent by the network device to the terminal is determined based on a uniform TA granularity. However, in the foregoing embodiment of this application, a TA granularity corresponding to each parameter set is set for the parameter set. Therefore, the network device can select, based on a parameter set corresponding to a resource occupied by the terminal, a corresponding TA granularity when determining the TA information for the terminal, so that the determined TA information can satisfy different requirements of different parameter sets on TA precision.

In a possible implementation, the TA granularity corresponding to the parameter set is in inverse proportion to the SCS in the parameter set; or when the CP type is a normal CP, the TA granularity corresponding to the parameter set is in inverse proportion to a CP length corresponding to the parameter set; or the TA granularity corresponding to the parameter set is a TA granularity corresponding to a value range within which the SCS in the parameter set falls; or the TA granularity corresponding to the parameter set is a TA granularity corresponding to a value range within which a CP length corresponding to the parameter set falls.

In a possible implementation, the TA granularity corresponding to the parameter set is in inverse proportion to the SCS in the parameter set; or when the CP type is a normal CP, the TA granularity corresponding to the parameter set is in inverse proportion to a CP length corresponding to the parameter set; or the TA granularity corresponding to the parameter set is a TA granularity corresponding to a value range within which the SCS in the parameter set falls; or the TA granularity corresponding to the parameter set is a TA granularity corresponding to a value range within which a CP length corresponding to the parameter set falls.

In a possible implementation, parameter sets including different SCSs correspond to different relative maximum latency differences.

In a possible implementation, TA information corresponding to different parameter sets occupies a same quantity of bits, and bits occupied by TA information corresponding to at least one parameter set include a reserved bit.

In a possible implementation, a quantity of bits occupied by TA information corresponding to at least one parameter set is different from a quantity of bits occupied by TA information corresponding to another parameter set.

In a possible implementation, the method further includes: receiving, by the terminal, timing advance group (TAG) information sent by the network device, where a frequency domain resource in each TAG is one of a bandwidth part, a bandwidth part with space direction information, and a component carrier with space direction information.

In a possible implementation, the method further includes: receiving, by the terminal, timing advance group (TAG) information sent by the network device, where frequency domain resources in each TAG correspond to a same parameter set or a parameter set corresponding to a frequency domain resource in each TAG satisfies a preset condition.

In a possible implementation, a maximum TAG quantity corresponding to at least one parameter set is different from a maximum TAG quantity corresponding to another parameter set.

In a possible implementation, a maximum TAG quantity corresponding to a parameter set is in proportion to an SCS in the parameter set; or a maximum TAG quantity corresponding to a parameter set is in proportion to a CP length corresponding to the parameter set; or a maximum TAG quantity corresponding to a parameter set is a maximum TAG quantity corresponding to a value range within which an SCS in the parameter set falls; or a maximum TAG quantity corresponding to a parameter set is a maximum TAG quantity corresponding to a value range within which a CP length corresponding to the parameter set falls.

In a possible implementation, a maximum TAG quantity corresponding to a parameter set including an SCS that is 15 kHz and a CP type that is a normal CP is 4; or a maximum TAG quantity corresponding to a parameter set including an SCS that is 30 kHz and a CP type that is a normal CP is 8; or a maximum TAG quantity corresponding to a parameter set including an SCS that is 60 kHz is 16; or a maximum TAG quantity corresponding to a parameter set including an SCS that is 60 kHz and a CP type that is an extended CP is 8 or 16; or a maximum TAG quantity corresponding to a parameter set including an SCS that is 120 kHz and a CP type that is a normal CP is 32.

In a possible implementation, a parameter set including an SCS that is 60 kHz and a CP type that is a normal CP and a parameter set including an SCS that is 60 kHz and a CP type that is an extended CP are different in at least one of TA granularities, quantities of bits occupied by TA information, and maximum TAG quantities that respectively correspond to the two parameter sets.

According to a third aspect, a timing advance (TA) determining method provided in an embodiment of this application includes: determining, by a network device, TA information used by a terminal on an occupied frequency domain resource; and sending, by the network device, the TA information to the terminal, where a parameter set includes a subcarrier spacing of the frequency domain resource and a cyclic prefix type of a symbol on the frequency domain resource; and TA information corresponding to different parameter sets occupies a same quantity of bits, and bits occupied by TA information corresponding to at least one parameter set include a reserved bit; or a quantity of bits occupied by TA information corresponding to at least one parameter set is different from a quantity of bits occupied by TA information corresponding to another parameter set.

According to a fourth aspect, a timing advance group (TAG) determining method provided in an embodiment of this application includes: determining, by a network device, TAG information; and sending, by the network device, the TAG information to a terminal, where a parameter set includes a subcarrier spacing and a cyclic prefix type, different parameter sets correspond to different maximum TAG quantities, and a maximum TAG quantity corresponding to at least one parameter set is different from a maximum TAG quantity corresponding to another parameter set.

According to a fifth aspect, a network device provided in an embodiment of this application includes a processor, and a memory and a transmitter that are separately connected to the processor. The processor is configured to invoke a computer program prestored in the memory to perform a corresponding function in the method embodiment according to the first aspect. For details, refer to detailed descriptions in the method embodiment. Details are not described herein again.

According to a sixth aspect, a terminal provided in this application includes a processor, and a memory and a receiver that are separately connected to the processor. The processor is configured to invoke a computer program prestored in the memory to perform a corresponding function in the method embodiment according to the second aspect. For details, refer to detailed descriptions in the method embodiment. Details are not described herein again.

According to a seventh aspect, a network device provided in this application includes a processor, and a memory and a transmitter that are separately connected to the processor. The processor is configured to invoke a computer program prestored in the memory to perform a corresponding function in the method embodiment according to the third aspect. For details, refer to detailed descriptions in the method embodiment. Details are not described herein again.

According to an eighth aspect, a network device provided in this application includes a processor, and a memory and a transmitter that are separately connected to the processor. The processor is configured to invoke a computer program prestored in the memory to perform a corresponding function in the method embodiment according to the fourth aspect. For details, refer to detailed descriptions in the method embodiment. Details are not described herein again.

According to a ninth aspect, this application provides a computer readable storage medium. The computer readable storage medium stores a computer instruction. When the instruction runs on a computer, the computer is enabled to perform the method according to any one of the first aspect to the fourth aspect.

DETAILED DESCRIPTION OF ILLUSTRATIVE EMBODIMENTS

To make the objectives, technical solutions, and advantages of this application clearer, the following further describes this application in detail with reference to the accompanying drawings.

In a current technology, different terminals perform orthogonal multiple access (orthogonal multiple access) in time and frequency during uplink transmission. In other words, uplink transmission performed by different terminals from a same cell does not interfere with each other. To ensure orthogonality of uplink transmission and avoid intra-cell interference, a network device requires that signals sent by terminals in a same subframe but on different frequency domain resources arrive at the network device at basically the same time.

Figure 1:
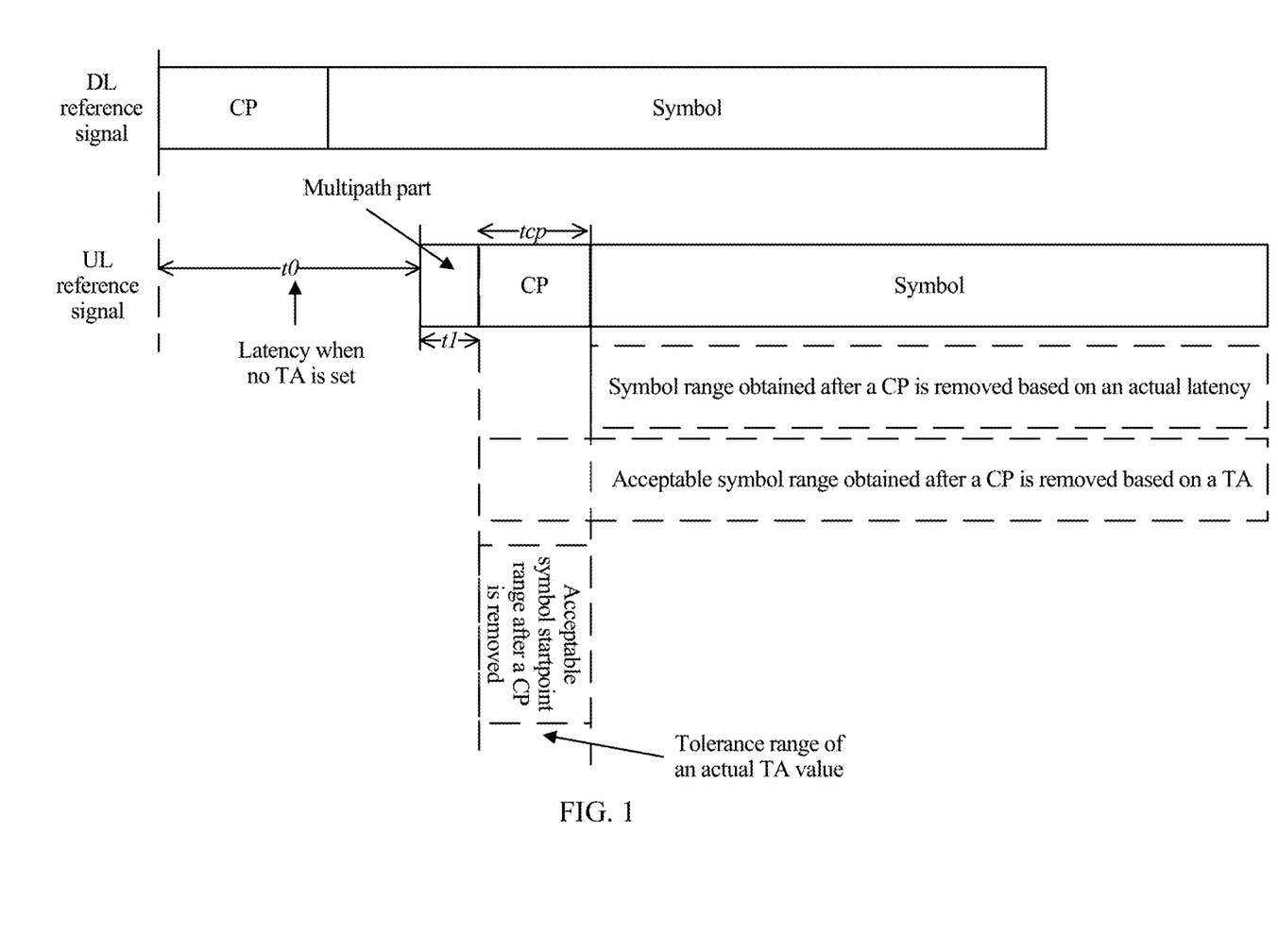
FIG. 1 is a schematic diagram of a single-carrier TA according to an embodiment of this application.

As shown in FIG. 1, a network device sends a downlink signal at a moment, and then receives, after a time period of $t_0$, an uplink signal sent by a terminal. The network device already learns that the uplink signal includes a multipath part and a CP part, and after sending the downlink signal, the network device starts to obtain a data symbol part after a time period of $t_0+t_1+t_{cp}$. Due to factors such as different component carriers (CC) used by the terminal, lengths of time periods $t_0$ are different. To enable signals sent by different terminals to arrive at the network device basically at the same time, a TA mechanism is introduced. To be specific, the network device determines corresponding TA values for a plurality of terminals, and each terminal sends an uplink signal in advance of a period of time based on a TA value corresponding to the terminal, so that the signals sent by the different terminals arrive at the network device basically at the same time.

An ideal TA value is $t_0$. To be specific, after sending the downlink signal, the network device starts to obtain the data symbol part after a time period of $t_1+t_{cp}$. A CP is formed by copying a segment of data after a data symbol and putting the segment of data to the front of the symbol. Therefore, the network device can correctly decode uplink data sent by the terminal, provided that network device receives the uplink data within a range of the CP. This provides an error tolerance range for the TA value. In other words, the network device can implement correct decoding, provided that after sending the downlink signal, the network device starts to obtain the data symbol after a time period from $t_1$ to $t_{cp}$, that is, $t_0-t_{cp} \le TA \le t_0$.

Figure 2:
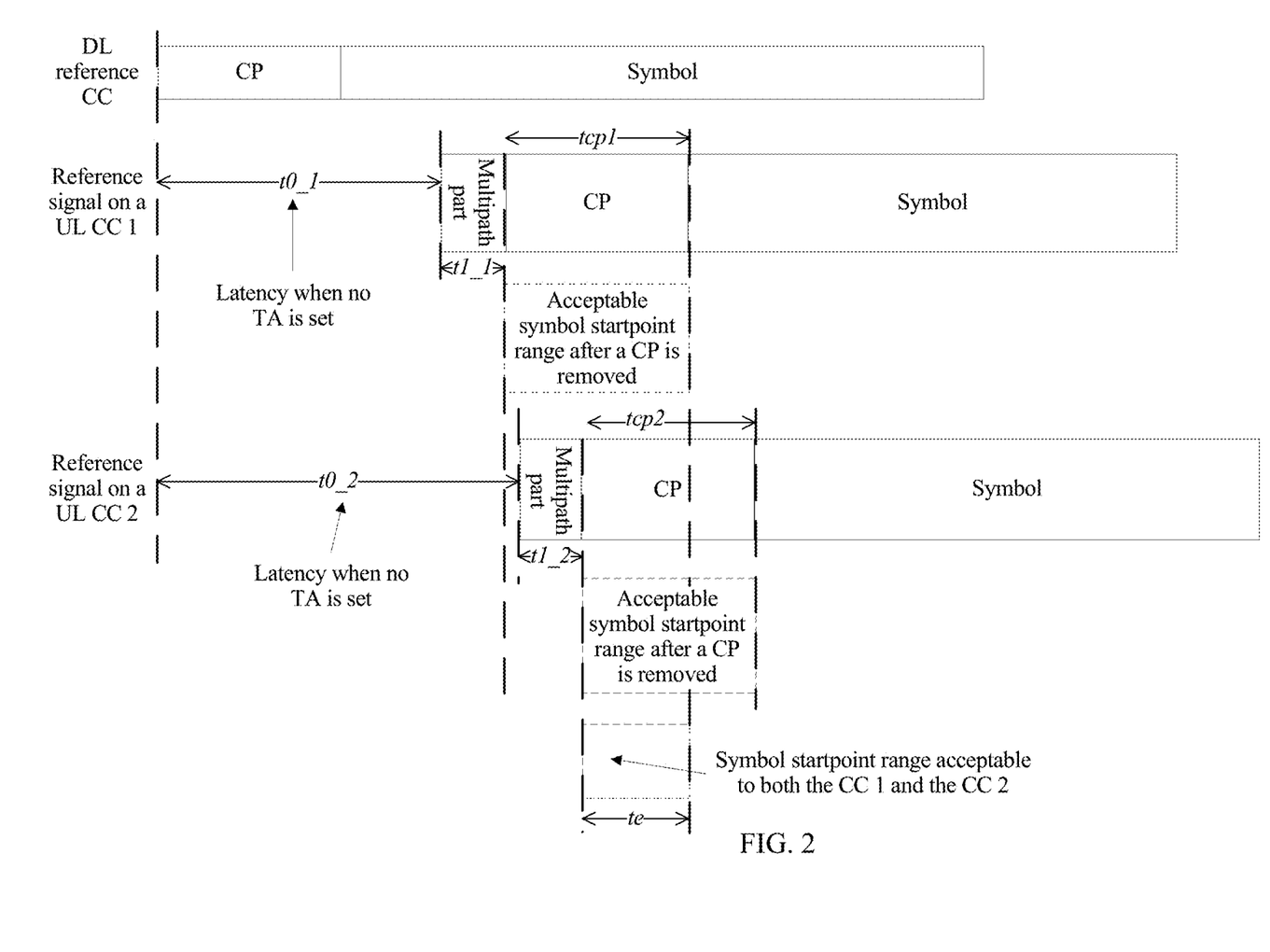
FIG. 2 is a schematic diagram of a dual-carrier TA according to an embodiment of this application.

Because the TA value has a specific error tolerance range, uplink signals on different frequency domain resource may use a same TA value, so that the network device can still correctly decode uplink data. As shown in FIG. 2, an error tolerance range of a TA of a component carrier 1 and an error tolerance range of a TA of a component carrier 2 having an overlapping part. Therefore, the component carrier 1 and the component carrier 2 may share a same TA value.

Because some component carriers may share a same TA value, the network device may group frequency domain resources to obtain a plurality of timing advance groups (TAG), and frequency domain resources belonging to a same TAG may share a same TA value.

When the terminal accesses the network device, the network device may configure a TA value for the terminal. However, due to a factor such as movement of the terminal, the TA value needs to be updated accordingly. The network device may further determine a TA adjustment value for the terminal based on the original TA value. In the current system, a TA granularity used by the network device when the network device determines the TA value or the TA adjustment value for the terminal is 16 Ts. If the TA value or the TA adjustment value indicated by the network device to the terminal is 2, it indicates that the TA value or the TA adjustment value of the terminal is $2*16$ Ts=$2*16*1/(15000*2048) \approx 1.04$ μs.

However, in a 5G or future communications system, there are a plurality of combinations, namely, a plurality of parameter sets, of a subcarrier spacing and a cyclic prefix type on a frequency domain resource, and different parameter sets have different requirements on TA precision. Consequently, the TA granularity used in the current system cannot meet requirements of all parameter sets on TA precision.

To resolve the foregoing technical problem, this application provides a TA determining method and a device, to meet different requirements of different parameter sets on TA precision.

The network device in the embodiments of this application may be a gNodeB (gNB) in a 5G communications system, an evolved NodeB (eNB) in an LTE system, a macro base station, a micro base station (also referred to as a "small cell"), a picocell base station, an access point (AP), a transmission point (TP), or the like. This is not limited in this application.

The terminal in the embodiments of this application may be referred to as an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, or a terminal device in a future 5G network, or the like.

Figure 3:
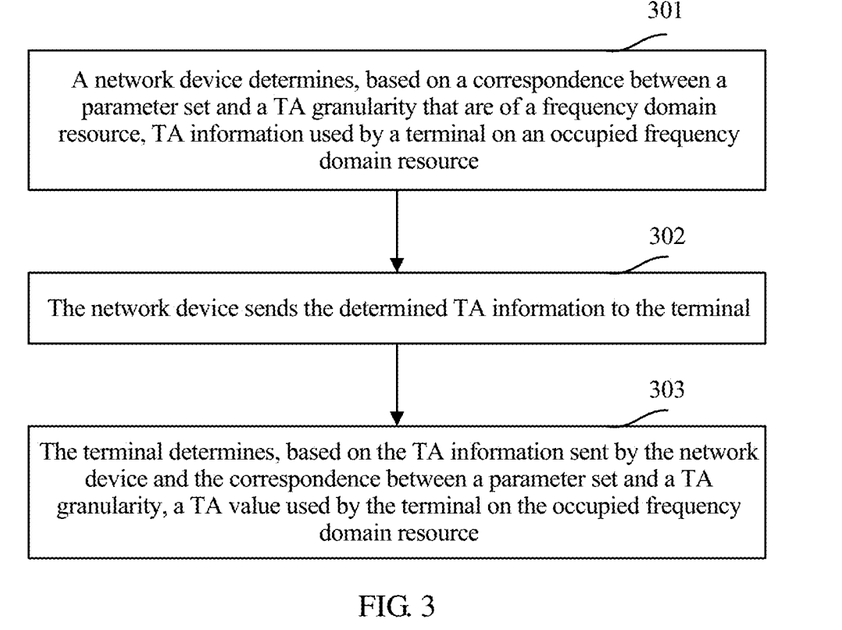
FIG. 3 is a schematic flowchart of a timing advance determining method according to an embodiment of this application.

FIG. 3 is a schematic flowchart of a timing advance determining method according to an embodiment of this application. As shown in FIG. 3, the method may include the following steps.

Step 301: A network device determines, based on a correspondence between a parameter set and a TA granularity, TA information used by a terminal on an occupied frequency domain resource.

The parameter set includes a subcarrier spacing and a cyclic prefix type of a symbol. For example, the parameter set may be shown in Table 1.

The TA information determined by the network device may be a TA adjustment value. For example, if a TA value currently used by the terminal is 64 Ts, and the network device determines, based on location information of the terminal, that the TA value of the terminal should be increased by 16 Ts, the TA information determined by the network device may be +16 Ts. For another example, if an initial access TA value of the terminal is 0, and the network device determines, based on location information of the terminal, that the TA value of the terminal should be increased by 16 Ts, the TA information determined by the network device may be 16 Ts. Certainly, the TA information determined by the network device may be a TA value.

Step 302: The network device sends the determined TA information to the terminal.

Step 303: The terminal determines, based on the TA information sent by the network device and the correspondence between a parameter set and a TA granularity, a TA value used by the terminal on the occupied frequency domain resource.

Specifically, the terminal may first determine, based on the correspondence between a parameter set and a TA granularity, a TA granularity corresponding to the frequency domain resource occupied by the terminal, and then determine the TA value based on the determined TA granularity and the TA information sent by the network device.

The correspondence between a parameter set and a TA granularity is usually preset. For example, the correspondence between a parameter set and a TA granularity may be specified in a communication standard protocol, and the network device and the terminal may prestore the correspondence that is between a parameter set and a TA granularity and that is specified in the communication standard protocol. In this case, after the network device schedules a resource for the terminal, both the network device and the terminal may determine, based on a parameter set corresponding to the resource scheduled by the network device for the terminal and the correspondence that is between a parameter set and a TA granularity and that is prestored in each of the network device and the terminal, the TA granularity used by the network device when the network device indicates the TA information to the terminal.

In a possible implementation, the TA granularity corresponding to the parameter set may be in inverse proportion to the subcarrier spacing in the parameter set. For example, the correspondence between a parameter set and a TA granularity may be shown in Table 2. As described above, symbols at different locations in a numerology may not have an exactly same CP length. CP lengths in Table 2 to Table 5 in this application are all shortest CP lengths.

TABLE 2

| Numerology | TA granularity (Ts) |
|---|---|
| 15 kHz and an NCP | 16 |
| 30 kHz and an NCP | 8 |
| 60 kHz and an NCP | 4 |
| 60 kHz and an ECP | 4 |
| 120 kHz and an NCP | 2 |

In this application, a minimum time unit Ts, namely, $1/(204.8*15000)$ second, defined in LTE is used as an example. If a minimum time unit Ts_NR is redefined in NR or a future communications system, Ts in this application may be replaced by Ts_NR; or a time length in a unit of Ts that is provided in this embodiment of this application is converted into a time length in a unit of Ts_NR. For example, if $Ts\_NR=1/(480000*4096)$ second, that is, $Ts=Ts\_NR*64$, in this application, 16 Ts=16*64 Ts_NR=1024 Ts_NR.

In addition, the TA granularity corresponding to the parameter set may be in inverse proportion to the subcarrier spacing only when the CP type is an NCP. A parameter set including an SCS that is 60 kHz and a CP type that is an ECP may be separately set, for example, may be set to have a TA granularity that is the same as none of TA granularities of the other parameter sets, or may be set to have a same TA granularity as a parameter set including an SCS that is 60 kHz and a CP type that is an NCP, or may be set to have a same TA granularity as a parameter set including an SCS that is 15 kHz and a CP type that is an NCP, or may be set to have a same TA granularity as a parameter set including an SCS that is 30 kHz and a CP type that is an NCP.

In another possible implementation, when the CP type is an NCP, the TA granularity corresponding to the parameter set may be in inverse proportion to a CP length corresponding to the parameter set. For example, the correspondence between a parameter set and a TA granularity may be shown in Table 3.

TABLE 3

| Numerology | CP length (Ts) | TA granularity (Ts) |
|---|---|---|
| 15 kHz and an NCP | 144 | 16 |
| 30 kHz and an NCP | 72 | 8 |
| 60 kHz and an NCP | 36 | 4 |
| 60 kHz and an ECP | 128 | 8/16 |
| 120 kHz and an NCP | 18 | 2 |

A parameter set including an SCS that is 60 kHz and a CP type that is an ECP may be separately set, for example, may be set to have a TA granularity that is the same as none of TA granularities of the other parameter sets, or may be set to have a same TA granularity as a parameter set including an SCS that is 60 kHz and a CP type that is an NCP, or may be set to have a same TA granularity as a parameter set including an SCS that is 15 kHz and a CP type that is an NCP, or may be set to have a same TA granularity as a parameter set including an SCS that is 30 kHz and a CP type that is an NCP.

In addition to the foregoing implementations, the corresponding TA granularity may be set based on a value range of the SCS in the parameter set. For example, the correspondence between a parameter set and a TA granularity may be shown in Table 4. Alternatively, the corresponding TA granularity may be set based on a value range of a CP length corresponding to the parameter set. For example, the correspondence between a parameter set and a TA granularity may be shown in Table 5.

TABLE 4

| Numerology | TA granularity (Ts) |
|---|---|
| 15 kHz and an NCP | 16 |
| 30 kHz and an NCP | 16 |
| 60 kHz and an NCP | 8 |
| 60 kHz and an ECP | 8 |
| 120 kHz and an NCP | 2 |

In Table 4, the TA granularity is set based on the value range of the SCS. For example, a TA granularity corresponding to a parameter set whose SCS is less than 60 kHz is 16 Ts; a TA granularity corresponding to a parameter set whose SCS is greater than or equal to 60 kHz and less than 120 kHz is 8 Ts; and a TA granularity corresponding to a parameter set whose SCS is greater than or equal to 120 kHz is 2 Ts.

TABLE 5

| Numerology | CP length (Ts) | TA granularity (Ts) |
|---|---|---|
| 15 kHz and an NCP | 144 | 16 |
| 30 kHz and an NCP | 72 | 8 |
| 60 kHz and an NCP | 36 | 8 |
| 60 kHz and an ECP | 128 | 16 |
| 120 kHz and an NCP | 18 | 2 |

In Table 5, the TA granularity is set based on the value range of the CP length corresponding to the parameter set. For example, a TA granularity corresponding to a parameter set whose CP length is greater than 72 Ts is 16 Ts; a TA granularity corresponding to a parameter set whose CP length is greater than 18 and less than or equal to 72 is 8 Ts; and a TA granularity corresponding to a parameter set whose CP length is less than or equal to 18 Ts is 2 Ts.

When the network device further determines the TA information based on the determined TA granularity, the determined TA information may be a TA value, or may be an adjustment value based on the original TA value. This is not limited in this application. That the TA information is a TA adjustment value is used below as an example for description.

The network device determines the TA adjustment value, and the adjustment value may be included in signaling and used for TA adjustment. For example, the TA adjustment value may be used for TA adjustment in a random access process (for example, the TA adjustment value may be included in random access response (RAR) signaling), or used for maintaining and updating TA information in an RRC connected mode (the TA adjustment value is sent in a timing advance MAC control element (TAC MAC-CE)), and is usually indicated by using several bits. For example, when the TA granularity is 16 Ts, the network device may indicate the TA adjustment value by using 4 bits, and a length of an adjustment range of the TA value is 16*16 (Ts). In addition to the TA adjustment value, the signaling used for TA adjustment may include other related information, for example, carry a TAG identity (TAG ID) indicating a TAG for which the TA adjustment value is used.

However, because different parameter sets have different requirements on TA precision, and correspond to different TA granularities, TA adjustment ranges may also be different. In this case, adjustment ranges required by different parameter sets may also be different.

To resolve the foregoing problem, in a possible implementation, a TA adjustment range corresponding to each parameter set may be determined for the parameter set, and a quantity of bits that need to be occupied by TA information of the parameter set is determined based on the adjustment range. Therefore, the determined quantities of bits occupied by TA information corresponding to all the parameter sets may be the same or may be different. For example, TA information corresponding to a parameter set including an SCS that is 60 kHz and a CP type that is an ECP occupies 6 bits, and TA information corresponding to another parameter set occupies 4 bits. In another possible implementation, after the quantities of bits that need to be occupied by the TA information of all the parameter sets are determined, a largest quantity of bits may be selected as a quantity of bits that correspond to all the parameter sets. A quantity of bits occupied by TA information corresponding to a parameter set that requires a relatively small quantity of bits may include a reserved bit. For example, the TA information corresponding to all the parameter sets needs to occupy 6 bits, and for a parameter set that requires only 4 bits, the 6 bits may include 2 reserved bits. Alternatively, bits occupied by TA information corresponding to a parameter set including an SCS that is 60 kHz and a CP type that is an ECP may include a reserved bit.

As described above, there is a difference between times at which signals on different frequency domain resources arrive at the network device. A difference between times at which signals with a same parameter set on different frequency domain resources arrive at the network device should not exceed a preset relative maximum latency difference corresponding to the parameter set.

Optionally, different parameter sets correspond to different relative maximum latency differences. For example, if a plurality of frequency domain resources correspond to a parameter set including an SCS that is 15 kHz and a CP type that is an NCP, an allowable relative maximum latency difference between signals on the plurality of frequency domain resources is 30 μs. If a plurality of frequency domain resources correspond to a parameter set including an SCS that is 30 kHz and a CP type that is an NCP, an allowable relative maximum latency difference between signals on the plurality of frequency domain resources is 15 μs.

As described above, the network device may group frequency domain resources to obtain a plurality of TAGs, and frequency domain resources in all the TAGs share a same TA value. The network device may send TAG information to the terminal. The TAG information may be information about a frequency domain resource included in each TAG, or may be information about a TAG to which each piece of frequency domain resource information belongs.

When the frequency domain resources are grouped, a grouping granularity is a component carrier. For example, the network device groups a component carrier 1 and a component carrier 2 into a group, and groups a component carrier 3 and a component carrier 4 into a group.

In addition, in NR, a plurality of bandwidth parts (BWP) may be configured on one component carrier, and each bandwidth part may correspond to one parameter set. For example, the component carrier 1 includes frequency domain resources of 20M bandwidth. In this case, frequency domain resources of 10M bandwidth may be configured as a parameter set whose SCS is 15 kHz and whose CP type is an NCP, and these frequency domain resources are a bandwidth part 1. The other frequency domain resources of 10M bandwidth are configured as a parameter set whose SCS is 30 kHz and whose CP type is an NCP, and these frequency domain resources are a bandwidth part 2. In a possible implementation provided in this embodiment of this application, the grouping granularity may be a bandwidth part.

Figure 4:
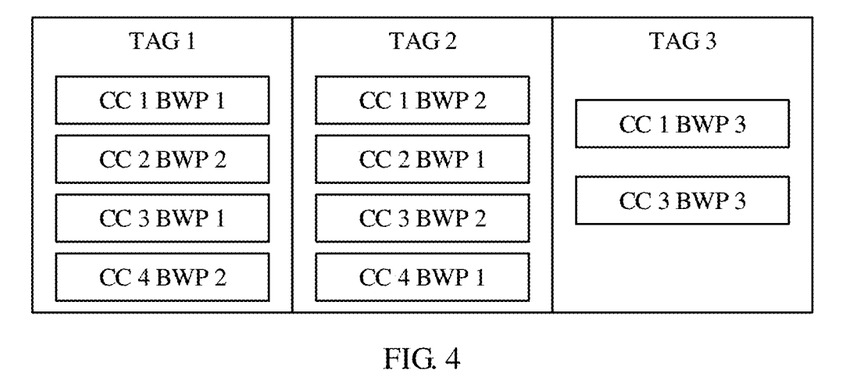
FIG. 4 is a first schematic diagram of a TAG according to an embodiment of this application.

Therefore, this embodiment of this application provides another possible implementation in which the network device may group bandwidth parts during TAG division. For example, as shown in FIG. 4, a TAG 1 includes a BWP 1 in a CC 1, a BWP 2 in a CC 2, a BWP 1 in a CC 3, and a BWP 2 in a CC 4; a TAG 2 includes a BWP 2 in the CC 1, a BWP 1 in the CC 2, a BWP 2 in the CC 3, and a BWP 1 in the CC 4; and a TAG 3 includes a BWP 3 in the CC 1 and a BWP 3 in the CC 3. In addition, a concept of a component carrier may no longer be retained. For example, a TAG 1 includes a BWP 1, a BWP 2, and a BWP 3; a TAG 2 includes a BWP 4, a BWP 5, and BWP 6; and a TAG 3 includes a BWP 7 and a BWP 8.

Figure 5:
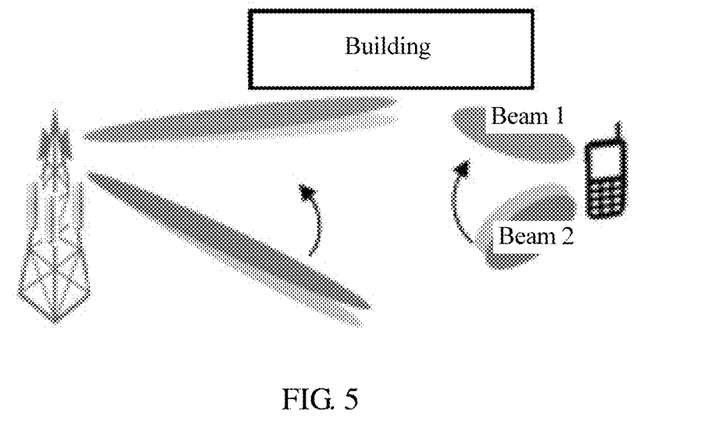
FIG. 5 is a schematic diagram of a beam according to an embodiment of this application.
Figure 6:
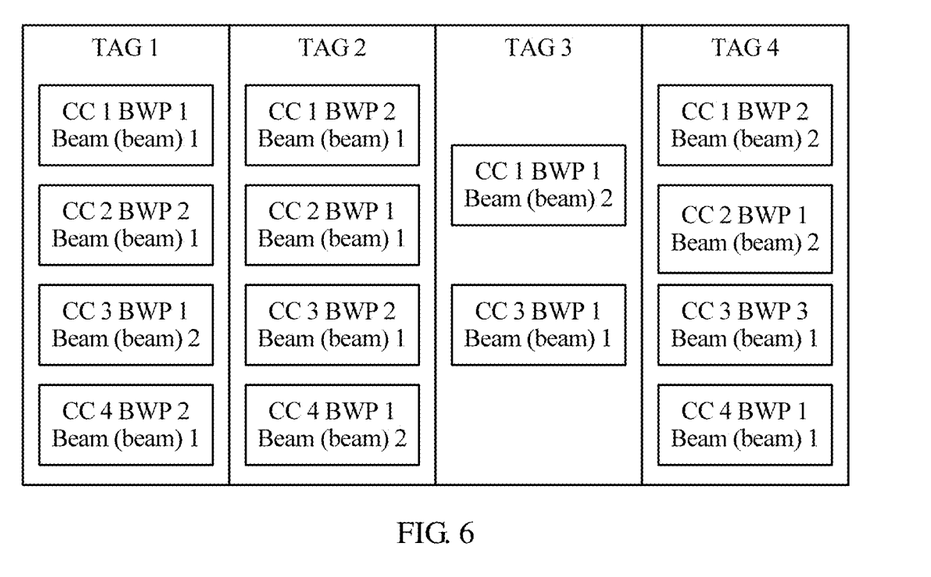
FIG. 6 is a second schematic diagram of a TAG according to an embodiment of this application.

This embodiment of this application further provides a possible implementation in which the network device may group bandwidth parts with space direction information during TAG division. As shown in FIG. 5, the network device schedules bandwidth parts occupied by terminals. However, even if a same bandwidth part is occupied, when signals are sent by using different beams, propagation paths and propagation latencies of the signals are still different. Therefore, the bandwidth parts may be subdivided, for example, subdivided into a BWP 1-beam 1, a BWP 1-beam 2, and the like. Correspondingly, TAGs obtained by the network device through division may be shown in FIG. 6. A TAG 1 includes a BWP 1-beam 1 in a CC 1, a BWP 2-beam 1 in a CC 2, a BWP 1-beam 2 in a CC 3, and a BWP 2-beam 1 in a CC 4; a TAG 2 includes a BWP 2-beam 1 in the CC 1, a BWP 1-beam 1 in the CC 2, a BWP 2-beam 1 in the CC 3, and a BWP 1-beam 2 in the CC 4; a TAG 3 includes a BWP 1-beam 2 in the CC 1 and a BWP 1-beam 1 in the CC 3; and a TAG 4 includes a BWP 2-beam 2 in the CC 1, a BWP 1-beam 2 in the CC 2, a BWP 3-beam 1 in the CC 3, and a BWP 1-beam 1 in the CC 4. Certainly, a concept of a component carrier may no longer be retained when the bandwidth parts with space direction information are grouped.

In addition, the network device may group component carriers with space direction information during TAG division. Details are not described herein.

In a possible implementation, when the network device groups frequency domain resources, frequency domain resources in each TAG correspond to a same parameter set. For example, if a BWP 1, a BWP 2, and a BWP 3 correspond to a same parameter set, and the BWP 1, the BWP 2, and the BWP 3 can use a same TA value, the BWP 1, the BWP 2, and the BWP 3 may be grouped into a group.

In another possible implementation, a parameter set corresponding to a frequency domain resource in each TAG satisfies a preset condition. For example, the preset condition may be as follows: If frequency domain resources correspond to a parameter set whose SCS is 15 kHz or 30 kHz, the frequency domain resources are allowed to be grouped into a same TAG.

The network device should obtain a TAG through division based on a preset maximum TAG quantity. In other words, a quantity of TAGs obtained through division should not exceed the preset maximum TAG quantity. The maximum TAG quantity depends on a maximum latency difference between times at which signals on different frequency domain resources arrive at the network device, and an allowable maximum latency difference in a TAG. If a maximum latency difference corresponding to a parameter is Y μs, and an allowable relative maximum latency difference in a TAG is μs, the maximum TAG quantity is Y/X ideally.

In actual application, different parameter sets may correspond to different maximum TAG quantities. In other words, not all parameter sets correspond to a same maximum TAG quantity. In some embodiments, a maximum TAG quantity corresponding to a parameter set may be set to be related to an SCS in the parameter set. For example, the maximum TAG quantity corresponding to the parameter set may be set to be in proportion to the SCS in the parameter set. For example, a maximum TAG quantity corresponding to a parameter set whose SCS is 15 kHz is 4; a maximum TAG quantity corresponding to a parameter set whose SCS is 30 kHz is 8; a maximum TAG quantity corresponding to a parameter set whose SCS is 60 kHz is 16; and a maximum TAG quantity corresponding to a parameter set whose SCS is 120 kHz is 32. Alternatively, a TAG corresponding to a parameter set may be related to a value range within which an SCS in the parameter set falls.

In some other embodiments, a maximum TAG quantity corresponding to a parameter set may be set to be related to a CP length. For example, the maximum TAG quantity is in proportion to the CP length. Alternatively, a maximum TAG quantity corresponding to a parameter set may be set based on a value range of a CP length. For example, a maximum TAG quantity corresponding to a parameter set whose CP length is greater than 72 Ts is 4; a maximum TAG quantity corresponding to a parameter set whose CP length is greater than 18 and less than or equal to 72 is 8; and a maximum TAG quantity corresponding to a parameter set whose CP length is less than or equal to 18 Ts is 16.

In some other embodiments, for a parameter set whose CP type is an NCP, a maximum TAG quantity is in proportion to an SCS in the parameter set. However, for a parameter set whose SCS is 60 kHz and whose CP type is an ECP, a maximum TAG quantity may be the same as or different from a maximum TAG quantity corresponding to another parameter set.

In some other embodiments, different maximum TAG quantities may be separately set for different parameter sets.

In the foregoing embodiment, because the network device groups the frequency domain resources, when the network device adjusts a TA value, it indicates that the network device adjusts TA values corresponding to all frequency domain resources in a TAG. When the network device sends TA information to the terminal, signaling carrying the TA information further includes a corresponding identity of the TAG.

In addition, it can be learned from Table 1 that for parameter sets whose CP types are the ECP, CP lengths are significantly different when SCSs are the same. Therefore, there are usually differences when the foregoing parameters are configured for the parameter sets whose CP types are the ECP. In some embodiments, a parameter set whose SCS is 60 kHz and whose CP type is an NCP and a parameter set including an SCS that is 60 kHz and a CP type that is an ECP are different in at least one of corresponding TA granularities, maximum TAG quantities, quantities of bits occupied by TA information, and allowable relative maximum latency differences.

With reference to any one of the foregoing embodiments, when sending the TA information to the terminal, the network device may send, to the terminal, information about a TAG and TA adjustment information corresponding to the TAG. The information about the TAG may be an identity (ID) of the TAG. Because different parameter sets correspond to different maximum TAG quantities, quantities of bits occupied by TAG IDs may be different. Therefore, quantities of bits occupied by TAG IDs corresponding to different parameter sets may be different or may be the same (to be specific, bits occupied by TAG IDs corresponding to some parameter sets include a reserved bit), or total quantities of bits occupied by TAG IDs and TA adjustment information corresponding to different parameter sets may be set to be the same.

As described above, in a 5G or future communications system, there are a plurality of combinations, namely, a plurality of parameter sets, of a subcarrier spacing and a cyclic prefix type on a frequency domain resource, and different parameter sets have different requirements on TA precision. Consequently, a quantity of bits used for indicating TA information in the current technology cannot meet requirements of all parameter sets on TA precision. To resolve the foregoing technical problem, an embodiment of this application provides a timing advance determining method. A schematic flowchart of the method may be shown in FIG. 7.

Figure 7:
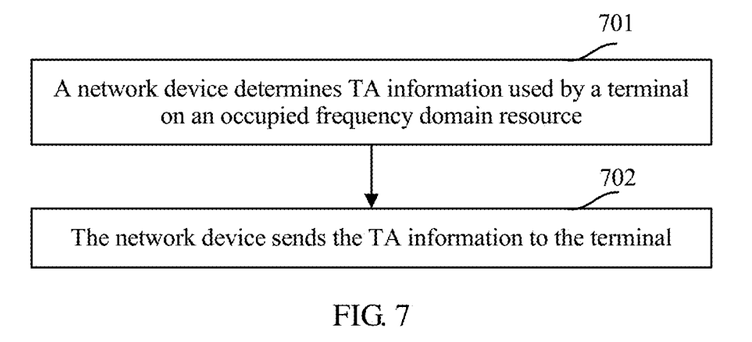
FIG. 7 is a schematic flowchart of another timing advance determining method according to an embodiment of this application.

Step 701: A network device determines TA information used by a terminal on an occupied frequency domain resource.

Subcarrier spacings on the frequency domain resource and cyclic prefix types of a symbol on the frequency domain resource may constitute a plurality of parameter sets. TA information corresponding to different parameter sets occupies a same quantity of bits, and bits occupied by TA information corresponding to at least one parameter set include a reserved bit; or a quantity of bits occupied by TA information corresponding to at least one parameter set is different from a quantity of bits occupied by TA information corresponding to another parameter set.

Step 702: The network device sends the TA information to the terminal.

In a possible implementation, a TA granularity may be set for each parameter set. For example, the TA granularity corresponding to the parameter set is in inverse proportion to an SCS in the parameter set; or when the CP type is an NCP, the TA granularity corresponding to the parameter set is in inverse proportion to a CP length corresponding to the parameter set; or the TA granularity corresponding to the parameter set is a TA granularity corresponding to a value range within which an SCS in the parameter set falls. Configuration of the TA granularity is similar to that in the foregoing method. Details are not described again.

In a possible implementation, parameter sets including different SCSs correspond to different relative maximum latency differences.

In a possible implementation, the network device may further send TAG information to the terminal. A frequency domain resource in each TAG is one of a bandwidth part, a bandwidth part with space direction information, and a component carrier with space direction information.

In a possible implementation, the network device may further send TAG information to the terminal. Frequency domain resources in each TAG correspond to a same parameter set or a parameter set corresponding to a frequency domain resource in each TAG satisfies a preset condition.

In a possible implementation, a maximum TAG quantity corresponding to at least one parameter set is different from a maximum TAG quantity corresponding to another parameter set.

In a possible implementation, a parameter set including an SCS that is 60 kHz and a CP type that is a normal CP and a parameter set including an SCS that is 60 kHz and a CP type that is an extended CP are different in at least one of TA granularities and maximum TAG quantities that respectively correspond to the two parameter sets.

As described above, in a 5G or future communications system, there are a plurality of combinations, namely, a plurality of parameter sets, of a subcarrier spacing and a cyclic prefix type on a frequency domain resource. Consequently, a maximum TAG quantity limited in the current technology cannot be applied to the 5G or future communications system. To resolve the foregoing technical problem, an embodiment of this application provides a timing advance determining method. A schematic flowchart of the method may be shown in FIG. 8.

Figure 8:
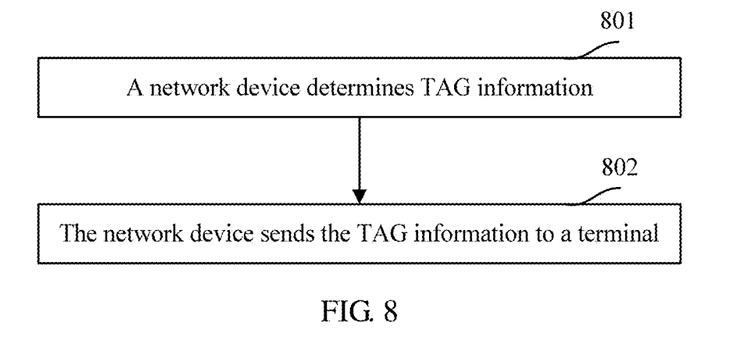
FIG. 8 is a schematic flowchart of a timing advance group determining method according to an embodiment of this application.

Step 801: A network device determines TAG information.

Subcarrier spacings and cyclic prefix types may constitute a plurality of parameter sets. A maximum TAG quantity corresponding to at least one parameter set is different from a maximum TAG quantity corresponding to another parameter set.

Step 802: The network device sends the TAG information to a terminal.

In a possible implementation, a TA granularity may be set for each parameter set. For example, the TA granularity corresponding to the parameter set is in inverse proportion to an SCS in the parameter set; or when the CP type is an NCP, the TA granularity corresponding to the parameter set is in inverse proportion to a CP length corresponding to the parameter set; or the TA granularity corresponding to the parameter set is a TA granularity corresponding to a value range within which an SCS in the parameter set falls. Configuration of the TA granularity is similar to that in the foregoing method. Details are not described again.

In a possible implementation, parameter sets including different SCSs correspond to different relative maximum latency differences.

In a possible implementation, TA information corresponding to different parameter sets occupies a same quantity of bits, and bits occupied by TA information corresponding to at least one parameter set include a reserved bit.

In a possible implementation, a quantity of bits occupied by TA information corresponding to at least one parameter set is different from a quantity of bits occupied by TA information corresponding to another parameter set.

In a possible implementation, the network device may further send the TAG information to the terminal. A frequency domain resource in each TAG is one of a bandwidth part, a bandwidth part with space direction information, and a component carrier with space direction information.

In a possible implementation, the network device may further send the TAG information to the terminal. Frequency domain resources in each TAG correspond to a same parameter set or a parameter set corresponding to a frequency domain resource in each TAG satisfies a preset condition.

Figure 9:
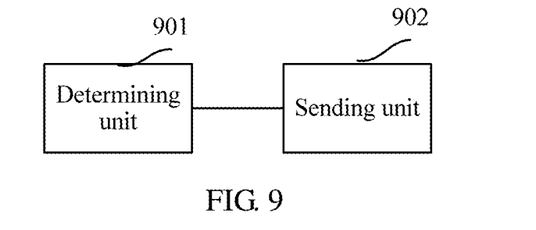
FIG. 9 is a schematic structural diagram of a network device according to an embodiment of this application.

Based on a same technical concept, an embodiment of this application further provides a network device, to implement the foregoing method embodiment. FIG. 9 is a schematic structural diagram of a network device according to an embodiment of this application. As shown in FIG. 9, the network device includes a determining unit 901 and a sending unit 902.

The determining unit 901 is configured to determine, based on a correspondence between a parameter set and a TA granularity, TA information used by a terminal on an occupied frequency domain resource, where the parameter set includes a subcarrier spacing (SCS) and a cyclic prefix (CP) type.

The sending unit 902 is configured to send the TA information to the terminal.

In a possible implementation, the sending unit 902 is further configured to send TAG information to the terminal, where a frequency domain resource in each TAG is one of a bandwidth part, a bandwidth part with space direction information, and a component carrier with space direction information.

In a possible implementation, the sending unit 902 is further configured to send TAG information to the terminal, where frequency domain resources in each TAG correspond to a same parameter set or a parameter set corresponding to a frequency domain resource in each TAG satisfies a preset condition.

In a possible implementation, when the CP type is a normal CP, the TA granularity corresponding to the parameter set is in inverse proportion to a CP length corresponding to the parameter set; or the TA granularity corresponding to the parameter set is a TA granularity corresponding to a value range within which a CP length corresponding to the parameter set falls.

In a possible implementation, TA information corresponding to different parameter sets occupies a same quantity of bits, and bits occupied by TA information corresponding to at least one parameter set include a reserved bit.

In a possible implementation, a quantity of bits occupied by TA information corresponding to at least one parameter set is different from a quantity of bits occupied by TA information corresponding to another parameter set.

In a possible implementation, a maximum TAG quantity corresponding to at least one parameter set is different from a maximum TAG quantity corresponding to another parameter set.

In a possible implementation, a maximum TAG quantity corresponding to a parameter set including an SCS that is 15 kHz and a CP type that is a normal CP is 4; or a maximum TAG quantity corresponding to a parameter set including an SCS that is 30 kHz and a CP type that is a normal CP is 8; or a maximum TAG quantity corresponding to a parameter set including an SCS that is 60 kHz is 16; or a maximum TAG quantity corresponding to a parameter set including an SCS that is 60 kHz and a CP type that is an extended CP is 8 or 16; or a maximum TAG quantity corresponding to a parameter set including an SCS that is 120 kHz and a CP type that is a normal CP is 32.

In a possible implementation, a parameter set including an SCS that is 60 kHz and a CP type that is a normal CP and a parameter set including an SCS that is 60 kHz and a CP type that is an extended CP are different in at least one of TA granularities, quantities of bits occupied by TA information, and quantities of maximum TAG quantities that respectively correspond to the two parameter sets.

Figure 10:
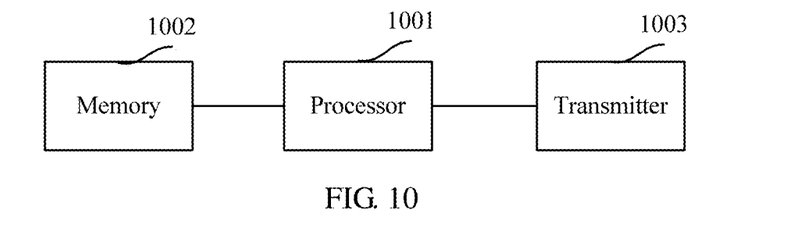
FIG. 10 is a schematic structural diagram of another network device according to an embodiment of this application.

Based on a same technical concept, an embodiment of this application further provides a network device, to implement the foregoing method embodiment. FIG. 10 is a schematic structural diagram of a network device according to an embodiment of this application. As shown in FIG. 10, the network device includes a processor 1001, and a memory 1002 and a transmitter 1003 that are connected to the processor 1001.

The processor 1001 is configured to read a computer program prestored in the memory 1002 to: determine, based on a correspondence between a parameter set and a timing advance (TA) granularity, TA information used by a terminal on an occupied frequency domain resource, where the parameter set includes a subcarrier spacing (SCS) and a cyclic prefix (CP) type; and send the TA information to the terminal by using the transmitter 1003.

In a possible implementation, the processor 1001 is further configured to send timing advance group (TAG) information to the terminal by using the transmitter 1003, where a frequency domain resource in each TAG is one of a bandwidth part, a bandwidth part with space direction information, and a component carrier with space direction information.

In a possible implementation, the processor 1001 is further configured to send TAG information to the terminal by using the transmitter 1003, where frequency domain resources in each TAG correspond to a same parameter set or a parameter set corresponding to a frequency domain resource in each TAG satisfies a preset condition.

In a possible implementation, when the CP type is a normal CP, the TA granularity corresponding to the parameter set is in inverse proportion to a CP length corresponding to the parameter set; or the TA granularity corresponding to the parameter set is a TA granularity corresponding to a value range within which a CP length corresponding to the parameter set falls.

In a possible implementation, TA information corresponding to different parameter sets occupies a same quantity of bits, and bits occupied by TA information corresponding to at least one parameter set include a reserved bit.

In a possible implementation, a quantity of bits occupied by TA information corresponding to at least one parameter set is different from a quantity of bits occupied by TA information corresponding to another parameter set.

In a possible implementation, different parameter sets correspond to different maximum TAG quantities.

In a possible implementation, a maximum TAG quantity corresponding to a parameter set including an SCS that is 15 kHz and a CP type that is a normal CP is 4; or a maximum TAG quantity corresponding to a parameter set including an SCS that is 30 kHz and a CP type that is a normal CP is 8; or a maximum TAG quantity corresponding to a parameter set including an SCS that is 60 kHz is 16; or a maximum TAG quantity corresponding to a parameter set including an SCS that is 60 kHz and a CP type that is an extended CP is 8 or 16; or a maximum TAG quantity corresponding to a parameter set including an SCS that is 120 kHz and a CP type that is a normal CP is 32.

In a possible implementation, a parameter set including an SCS that is 60 kHz and a CP type that is a normal CP and a parameter set including an SCS that is 60 kHz and a CP type that is an extended CP are different in at least one of TA granularities, quantities of bits occupied by TA information, and quantities of maximum TAG quantities that respectively correspond to the two parameter sets.

Figure 11:
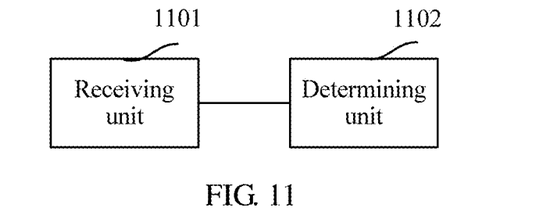
FIG. 11 is a schematic structural diagram of a terminal device according to an embodiment of this application.

Based on a same technical concept, an embodiment of this application further provides a terminal device, to implement the foregoing method embodiment. FIG. 11 is a schematic structural diagram of a terminal device according to an embodiment of this application. As shown in FIG. 11, the terminal device includes a receiving unit 1101 and a determining unit 1102.

The receiving unit 1101 is configured to receive TA information sent by a network device.

The determining unit 1102 is configured to: determine, based on a correspondence between a parameter set and a TA granularity, a TA granularity corresponding to a frequency domain resource occupied by the terminal, where the parameter set includes a subcarrier spacing (SCS) and a cyclic prefix (CP) type; and determine, based on the TA granularity and the TA information, a TA value used by the terminal on the occupied frequency domain resource.

In a possible implementation, the receiving unit 1101 is further configured to receive TAG information sent by the network device, where a frequency domain resource in each TAG is one of a bandwidth part, a bandwidth part with space direction information, and a component carrier with space direction information.

In a possible implementation, the receiving unit 1101 is further configured to receive TAG information sent by the network device, where frequency domain resources in each TAG correspond to a same parameter set or a parameter set corresponding to a frequency domain resource in each TAG satisfies a preset condition.

In a possible implementation, when the CP type is a normal CP, the TA granularity corresponding to the parameter set is in inverse proportion to a CP length corresponding to the parameter set; or the TA granularity corresponding to the parameter set is a TA granularity corresponding to a value range within which a CP length corresponding to the parameter set falls.

In a possible implementation, TA information corresponding to different parameter sets occupies a same quantity of bits, and bits occupied by TA information corresponding to at least one parameter set include a reserved bit.

In a possible implementation, a quantity of bits occupied by TA information corresponding to at least one parameter set is different from a quantity of bits occupied by TA information corresponding to another parameter set.

In a possible implementation, a maximum TAG quantity corresponding to at least one parameter set is different from a maximum TAG quantity corresponding to another parameter set.

In a possible implementation, a maximum TAG quantity corresponding to a parameter set including an SCS that is 15 kHz and a CP type that is a normal CP is 4; or a maximum TAG quantity corresponding to a parameter set including an SCS that is 30 kHz and a CP type that is a normal CP is 8;

or a maximum TAG quantity corresponding to a parameter set including an SCS that is 60 kHz is 16; or a maximum TAG quantity corresponding to a parameter set including an SCS that is 60 kHz and a CP type that is an extended CP is 8 or 16; or a maximum TAG quantity corresponding to a parameter set including an SCS that is 120 kHz and a CP type that is a normal CP is 32.

In a possible implementation, a parameter set including an SCS that is 60 kHz and a CP type that is a normal CP and a parameter set including an SCS that is 60 kHz and a CP type that is an extended CP are different in at least one of TA granularities, quantities of bits occupied by TA information, and quantities of maximum TAG quantities that respectively correspond to the two parameter sets.

Figure 12:
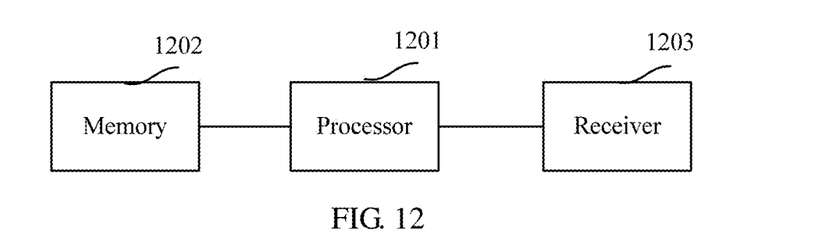
FIG. 12 is a schematic structural diagram of another terminal device according to an embodiment of this application.

Based on a same technical concept, an embodiment of this application further provides a terminal device, to implement the foregoing method embodiment. FIG. 12 is a schematic structural diagram of a terminal device according to an embodiment of this application. As shown in FIG. 12, the terminal device includes a processor 1201, and a memory 1202 and a receiver 1203 that are connected to the processor 1201.

The processor 1201 is configured to read a computer program prestored in the memory 1202 to: receive, by using the receiver 1203, TA information sent by a network device; determine, based on a correspondence between a parameter set and a TA granularity, a TA granularity corresponding to a frequency domain resource occupied by the terminal, where the parameter set includes a subcarrier spacing (SCS) and a cyclic prefix (CP) type; and determine, based on the TA granularity and the TA information, a TA value used by the terminal on the occupied frequency domain resource.

In a possible implementation, the processor 1201 is further configured to receive, by using the receiver 1203, timing advance group (TAG) information sent by the network device, where a frequency domain resource in each TAG is one of a bandwidth part, a bandwidth part with space direction information, and a component carrier with space direction information.

In a possible implementation, the processor 1201 is further configured to receive, by using the receiver 1203, TAG information sent by the network device, where frequency domain resources in each TAG correspond to a same parameter set or a parameter set corresponding to a frequency domain resource in each TAG satisfies a preset condition.

In a possible implementation, when the CP type is a normal CP, the TA granularity corresponding to the parameter set is in inverse proportion to a CP length corresponding to the parameter set; or the TA granularity corresponding to the parameter set is a TA granularity corresponding to a value range within which a CP length corresponding to the parameter set falls.

In a possible implementation, TA information corresponding to different parameter sets occupies a same quantity of bits, and bits occupied by TA information corresponding to at least one parameter set include a reserved bit.

In a possible implementation, a quantity of bits occupied by TA information corresponding to at least one parameter set is different from a quantity of bits occupied by TA information corresponding to another parameter set.

In a possible implementation, a maximum TAG quantity corresponding to at least one parameter set is different from a maximum TAG quantity corresponding to another parameter set.

In a possible implementation, a maximum TAG quantity corresponding to a parameter set including an SCS that is 15 kHz and a CP type that is a normal CP is 4; or a maximum TAG quantity corresponding to a parameter set including an SCS that is 30 kHz and a CP type that is a normal CP is 8; or a maximum TAG quantity corresponding to a parameter set including an SCS that is 60 kHz is 16; or a maximum TAG quantity corresponding to a parameter set including an SCS that is 60 kHz and a CP type that is an extended CP is 8 or 16; or a maximum TAG quantity corresponding to a parameter set including an SCS that is 120 kHz and a CP type that is a normal CP is 32.

In a possible implementation, a parameter set including an SCS that is 60 kHz and a CP type that is a normal CP and a parameter set including an SCS that is 60 kHz and a CP type that is an extended CP are different in at least one of TA granularities, quantities of bits occupied by TA information, and quantities of maximum TAG quantities that respectively correspond to the two parameter sets.

A person skilled in the art should understand that the embodiments of the present invention may be provided as a method, a system, or a computer program product. Therefore, the embodiments of the present invention may use a form of hardware only embodiments, software only embodiments, or embodiments with a combination of software and hardware. Moreover, the embodiments of the present invention may use a form of a computer program product that is implemented on one or more computer-usable storage media (including but not limited to a magnetic disk memory, a CD-ROM, an optical memory, and the like) that include computer-usable program code.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by the computer or the processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of the present invention without departing from the spirit and scope of this application. This application is intended to cover these modifications and variations made to the embodiments of the present invention provided that they fall within the scope of the claims of this application and their equivalent technologies.

What is claimed is:

1. A method, comprising:
   receiving, by a terminal, first timing advance (TA) information sent by a network device;
   determining, by the terminal based on a correspondence between a first parameter set and a first TA granularity, that the first TA granularity corresponds to a frequency domain resource occupied by the terminal, wherein the first parameter set comprises a first subcarrier spacing (SCS) and a first cyclic prefix (CP) type, wherein the first TA granularity corresponding to the first parameter set is non-inversely proportional to the subcarrier spacing when the CP type is not a normal cyclic prefix (NCP); and
   determining, by the terminal based on the first TA granularity and the first TA information, a TA value used by the terminal on the occupied frequency domain resource;
   wherein:
     a maximum timing advance group (TAG) quantity is limited to 4 based on the first parameter set comprising an SCS that is 15 kHz and a CP type that is a normal CP; or
     a maximum TAG quantity is limited to 8 based on the first parameter set comprising an SCS that is 30 kHz and a CP type that is a normal CP; or
     a maximum TAG quantity is limited to 16 based on the first parameter set comprising an SCS that is 60 kHz; or
     a maximum TAG quantity is limited to 8 or 16 based on the first parameter set comprising an SCS that is 60 kHz and a CP type that is an extended CP; or
     a maximum TAG quantity is limited to 32 based on the first parameter set comprising an SCS that is 120 kHz and a CP type that is a normal CP.

2. The method according to claim 1, further comprising:
   receiving, by the terminal, timing advance group (TAG) information sent by the network device, wherein the TAG information identifies one or more TAGs, and a frequency domain resource in each TAG is a bandwidth part, a bandwidth part with space direction information, or a component carrier with space direction information.

3. The method according to claim 1, further comprising:
   receiving, by the terminal, TAG information sent by the network device, wherein the TAG information identifies one or more TAGs; and
   wherein:
     frequency domain resources in each TAG correspond to a single parameter set; or
     a parameter set corresponding to a frequency domain resource in each TAG satisfies a preset condition.

4. The method according to claim 1, wherein:
   the first CP type is a normal CP, and the first TA granularity corresponding to the first parameter set is in inverse proportion to a CP length corresponding to the first parameter set; or
   the first TA granularity corresponding to the first parameter set corresponds to a value range within which a CP length corresponding to the first parameter set falls.

5. The method according to claim 1, wherein TA information corresponding to different parameter sets occupies a same quantity of bits, and bits occupied by the first TA information corresponding to the first parameter set comprise a reserved bit.

6. The method according to claim 1, wherein a quantity of bits occupied by the first TA information corresponding to the first parameter set is different from a quantity of bits occupied by second TA information corresponding to a second parameter set.

7. The method according to claim 1, wherein a maximum timing advance group (TAG) quantity corresponding to the first parameter set is different from a maximum TAG quantity corresponding to a second parameter set.

8. The method according to claim 1, wherein the first SCS comprised in the first parameter set is 60 kHz and the first CP type comprised in the first parameter set is a normal CP, and a second parameter set comprises a second SCS that is 60 kHz and a second CP type that is an extended CP; and
   wherein the first parameter set and the second parameter set have different TA granularities, quantities of bits occupied by TA information, or quantities of maximum timing advance group (TAG) quantities that respectively correspond to first parameter set and the second parameter set.

9. A network device, comprising:
   a transmitter;
   a processor; and
   a non-transitory computer-readable storage medium storing a program to be executed by the processor, the program including instructions for:
     determining, based on a correspondence between a first parameter set and a first timing advance (TA) granularity, TA information to be used by a terminal on an occupied frequency domain resource, wherein the first parameter set comprises a first subcarrier spacing (SCS) and a first cyclic prefix (CP) type, wherein the first TA granularity corresponding to the first parameter set is non-inversely proportional to the subcarrier spacing when the CP type is not a normal cyclic prefix (NCP); and
     sending the TA information to the terminal using the transmitter;
   wherein:
     a maximum timing advance group (TAG) quantity is limited to 4 based on the first parameter set comprising an SCS that is 15 kHz and a CP type that is a normal CP; or
     a maximum TAG quantity is limited to 8 based on the first parameter set comprising an SCS that is 30 kHz and a CP type that is a normal CP; or
     a maximum TAG quantity is limited to 16 based on the first parameter set comprising an SCS that is 60 kHz; or
     a maximum TAG quantity is limited to 8 or 16 based on the first parameter set comprising an SCS that is 60 kHz and a CP type that is an extended CP; or
     a maximum TAG quantity is limited to 32 based on the first parameter set comprising an SCS that is 120 kHz and a CP type that is a normal CP.

10. The network device according to claim 9, wherein the program further includes instructions for:
    sending timing advance group (TAG) information to the terminal using the transmitter, wherein a frequency domain resource in each TAG is a bandwidth part, a bandwidth part with space direction information, or a component carrier with space direction information.

11. The network device according to claim 9, wherein the program further includes instructions for:
  sending timing advance group (TAG) information to the terminal using the transmitter;
  wherein:
    frequency domain resources in each TAG correspond to a single parameter set; or
    a parameter set corresponding to a frequency domain resource in each TAG satisfies a preset condition.

12. A terminal device, comprising:
  receiver;
  a processor; and
  a non-transitory computer-readable storage medium storing a program to be executed by the processor, the program including instructions for:
    receiving, using the receiver, first timing advance (TA) information sent by a network device;
    determining, based on a correspondence between a first parameter set and a first TA granularity, that the first TA granularity corresponds to a frequency domain resource occupied by the terminal device, wherein the first parameter set comprises a first subcarrier spacing (SCS) and a first cyclic prefix (CP) type, wherein the first TA granularity corresponding to the first parameter set is non-inversely proportional to the subcarrier spacing when the CP type is not a normal cyclic prefix (NCP); and
    determining, based on the first TA granularity and the first TA information, a TA value used by the terminal device on the occupied frequency domain resource;
  wherein:
    a maximum timing advance group (TAG) quantity is limited to 4 based on the first parameter set comprising an SCS that is 15 kHz and a CP type that is a normal CP; or
    a maximum TAG quantity is limited to 8 based on the first parameter set comprising an SCS that is 30 kHz and a CP type that is a normal CP; or
    a maximum TAG quantity is limited to 16 based on the first parameter set comprising an SCS that is 60 kHz; or
    a maximum TAG quantity is limited to 8 or 16 based on the first parameter set comprising an SCS that is 60 kHz and a CP type that is an extended CP; or
    a maximum TAG quantity is limited to 32 based on the first parameter set comprising an SCS that is 120 kHz and a CP type that is a normal CP.

13. The terminal device according to claim 12, wherein the program further includes instructions for:
  receiving, using the receiver, timing advance group (TAG) information sent by the network device, wherein a frequency domain resource in each TAG is a bandwidth part, a bandwidth part with space direction information, or a component carrier with space direction information.

14. The terminal device according to claim 12, wherein the program further includes instructions for:
  receiving, using the receiver, timing advance group (TAG) information sent by the network device;
  wherein:
    frequency domain resources in each TAG correspond to a single parameter set; or
    a parameter set corresponding to a frequency domain resource in each TAG satisfies a preset condition.

15. The terminal device according to claim 12, wherein:
  the first CP type is a normal CP, and the first TA granularity corresponding to the first parameter set is in inverse proportion to a CP length corresponding to the first parameter set; or
  the first TA granularity corresponding to the first parameter set corresponds to a value range within which a CP length corresponding to the first parameter set falls.

16. The terminal device according to claim 12, wherein TA information corresponding to different parameter sets occupies a same quantity of bits, and bits occupied by the first TA information corresponding to the first parameter set comprise a reserved bit.

17. The terminal device according to claim 12, wherein a quantity of bits occupied by the first TA information corresponding to the first parameter set is different from a quantity of bits occupied by second TA information corresponding to a second parameter set.

18. The terminal device according to claim 12, wherein different parameter sets correspond to different maximum timing advance group (TAG) quantities.

* * * * *